(12) United States Patent
Edwards

(10) Patent No.: US 8,321,994 B2
(45) Date of Patent: Dec. 4, 2012

(54) FURNITURE SLIDE

(75) Inventor: Donald V. Edwards, Harrison City, PA (US)

(73) Assignee: SIMTEC, Co., Irwin, PA (US)

( * ) Notice: Subject to any disclaimer, the term of this patent is extended or adjusted under 35 U.S.C. 154(b) by 358 days.

(21) Appl. No.: 12/804,678

(22) Filed: Jul. 27, 2010

(65) Prior Publication Data

US 2012/0023707 A1 Feb. 2, 2012

(51) Int. Cl.
*A47B 91/06* (2006.01)

(52) U.S. Cl. ......................................... 16/42 R

(58) Field of Classification Search .................. 16/42 R, 16/42 T; 248/188.8, 188.9, 188.3, 188.2, 248/346.07, 346.11; D8/400, 402, 374, 354
See application file for complete search history.

(56) References Cited

U.S. PATENT DOCUMENTS

| | | | | |
|---|---|---|---|---|
| 1,069,141 A | * | 8/1913 | Jones | 248/346.11 |
| 2,030,649 A | * | 2/1936 | Miller | 16/42 R |
| 3,326,508 A | * | 6/1967 | Born | 248/346.11 |
| 5,081,740 A | * | 1/1992 | Smith | 16/42 R |
| 5,220,705 A | * | 6/1993 | Bushey | 16/42 R |
| 5,310,156 A | * | 5/1994 | Matsumura et al. | 248/615 |
| 5,984,360 A | | 11/1999 | Edwards et al. | |
| 6,206,424 B1 | | 3/2001 | Edwards et al. | |
| 6,901,629 B2 | * | 6/2005 | Wurdack | 16/42 R |
| 2003/0163894 A1 | * | 9/2003 | Jones et al. | 16/42 R |
| 2005/0081330 A1 | * | 4/2005 | Edwards | 16/42 R |
| 2005/0263998 A1 | | 12/2005 | Edwards | |
| 2010/0050389 A1 | * | 3/2010 | Robinson et al. | 16/42 R |

FOREIGN PATENT DOCUMENTS

| | | | |
|---|---|---|---|
| DE | 4120843 A1 | * | 1/1992 |
| DE | 102005042170 | * | 3/2007 |
| EP | 733323 A1 | * | 9/1996 |
| FR | 2711900 A1 | * | 5/1995 |
| FR | 2868673 A1 | * | 10/2005 |

* cited by examiner

*Primary Examiner* — Chuck Y. Mah
(74) *Attorney, Agent, or Firm* — Carothers & Carothers

(57) ABSTRACT

A furniture slide for placement between an object to be moved and flooring over which the object is to be moved. The slide member has top and bottom faces wherein the bottom face is provided with a smooth surface for sliding on a carpeted floor. A block of compressible material is provided with a top surface for supportive contact with an object or furniture to be moved, and the block is configured and dimensioned for a bottom surface thereof to be removably supported on the top face of the slide member. The bottom face of this compressible block is comprised of a fabric material for sliding engagement on a hard floor surface.

8 Claims, 3 Drawing Sheets

FURNITURE SLIDE

BACKGROUND OF THE INVENTION

The present invention pertains to a furniture slide for easy and efficiently moving heavy objects across floor surfaces. This invention is especially concerned with a furniture slide which is convertible for movement of furniture and other objects across floor surfaces having different or varying texture.

In the moving industry and in the carpet cleaning industry, it is quite usual to face the situation of having to move large, heavy and sometimes awkwardly shaped furniture within the confines of buildings. The most common method used for moving heavy objects is for the movers or cleaners to pick the object up and carry it by hand, but this is not always a feasible or preferable arrangement. With the exception of moving furniture up and down stairways, or a special orientation of heavy or awkwardly shaped furniture which requires lifting, it has been found that placing slides under the object to be moved is beneficial so that the article may be slid across the horizontal surfaces which it must traverse in order to be relocated or moved within the confines of the building.

Various other prior art devices have been suggested for placing under the legs of furniture or placing under a furniture base which does not include legs, in order that the furniture may be moved across floor surfaces. The prior art devices, however, do not take into consideration all of the problems that are associated with moving heavy furniture or other objects across a flooring surface, which may even be a rugged surface. One of the problems that exists is that the surface sliding across the carpet must be a type of material that provides minimal friction between the carpet and the sliding surface, while the upper portion of the slide that meets with the furniture object must provide sufficient frictional contact with the furniture.

Further problems with furniture slides involve furniture slides catching upon the rugged surface on which it slides, causing the slides to come out from underneath the furniture object being moved.

Another problem encountered with conventional furniture slides is that they are generally adapted to slide over carpeted surfaces and therefore do not easily and efficiently slide over hard floor surfaces, such as hardwood or tile. It is accordingly an object of the present invention to provide a furniture slide which is convertible or adaptable to either carpeted or hard floor situations.

SUMMARY OF THE INVENTION

The furniture slide of the present invention is provided for placement between an object to be moved and flooring over which the object is to be moved, and is comprised of a slide member having top and bottom faces wherein the bottom face has a smooth surface for sliding on a carpeted floor. A block of compressible material having a top surface for supportive contact with the object to be moved is provided and the block is configured and dimensioned for a bottom surface thereof to be removably supported on the top face of the slide member. The bottom face of this block is comprised of a fabric material, such as felt, for sliding engagement on hard floor surfaces, thereby providing a furniture slide that may be converted for sliding furniture and other objects over a carpeted surface to sliding over hard floor surfaces, such as hardwood or tile floors.

The top face of the slide member may have an upwardly protruding lip that is contoured and dimensioned to receive and confine the block of compressible material therein for removable confinement and support on the top face of the slide member. This maintains the compressive block in assured contact with the underlying slide member while the furniture or object is being moved.

As an alternative to this upward protruding lip for confining and containing the block of compressible material, the top face of the slide member may be provided with an adhesive means for temporarily securing the fabric material to the top face of the slide member. As one example, this adhesive means may consist of hook securement fabric, such as the hook fabric used with hook and loop securement materials, such as manufactured under the trademark Velcro, which is secured to the top face of the slide member. Accordingly, the fabric material on the bottom surface of the block of compressible material will be temporarily engaged and held in position by the hook securement fabric. For example, the hook securement fabric will readily secure itself to a felt fabric.

As an additional alternative, the fabric material provided on the bottom of the compressible block may be looped securement fabric whereby the adhesive means in the form of hook securement fabric on the top face of the slide member readily secures to the loop fabric. The loop securement fabric readily slides on hard surfaces and thus is suitable, instead of felt, for sliding engagement on hard floor surfaces.

In typical fashion as with prior art furniture slides, the furniture slides of the present invention may have the slide member provided with upturned perimeter edges and the bottom face of the slide members may also be convex for easier sliding on carpeted surfaces.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

DETAILED DESCRIPTION OF THE PREFERRED EMBODIMENTS

Figure 1:
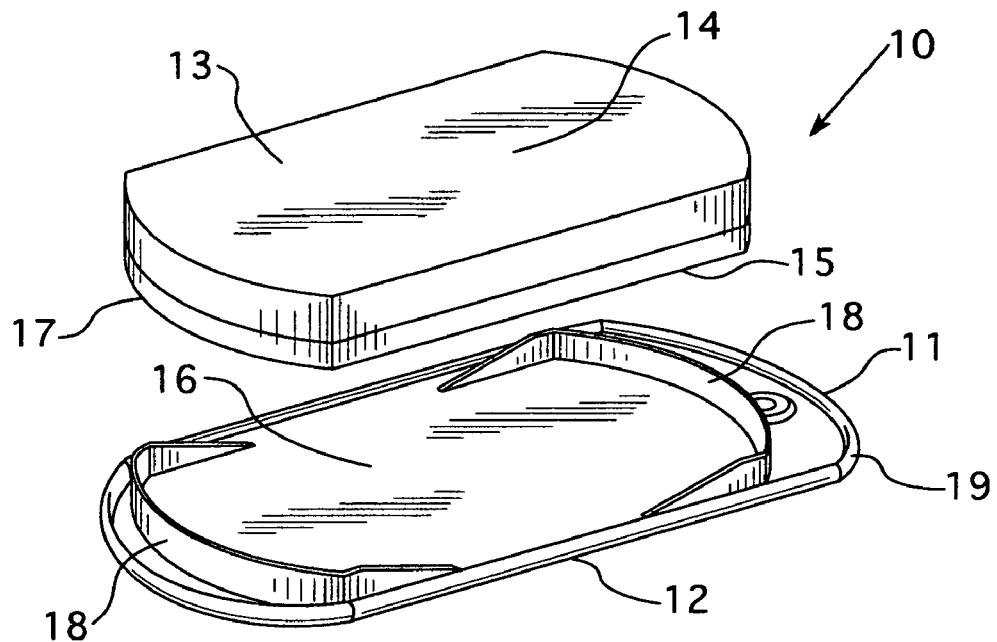
FIG. 1 is an exploded perspective view of one embodiment of the furniture slide of the present invention.
Figure 2:
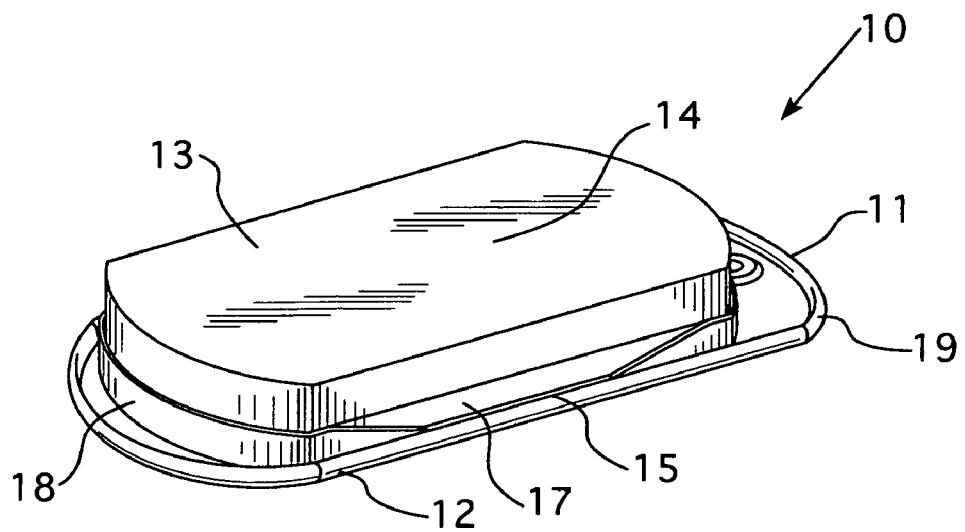
FIG. 2 is a perspective view of the furniture slide shown in FIG. 1 in combined form.

With reference first to the embodiment illustrated in FIGS. 1 and 2, the furniture slide 10 of the present invention is provided for placement between an object to be moved (not shown) and flooring (not shown) over which the object is to be moved. The furniture slide 10 is comprised of a slide member 11 molded of a suitable plastic and having a smooth bottom face 12 for sliding on a carpeted floor. A block of compressible material 13, such as EDA foam, for assured engagement with a furniture leg or base and having a top surface 14 for supportive contact with an object to be moved, is configured and dimensioned for the bottom surface 15 thereof to be removably supported on the top face 16 of slide member 11. The bottom surface 15 of block 13 is comprised of a felt or other suitable fabric material 17 for sliding engagement on a hard floor surface.

The top face 16 of slide member 11 is provided with an upward protruding lip 18 that is contoured and dimensioned for receiving and confining block 13 therein for removable support on top face 16.

The bottom face 12 of slide member 11 is provided with an upturn perimeter edge 19 to permit easy and efficient sliding of bottom face 12 over a carpeted surface. Bottom face 12 is also provided with a convex curvature to further assist in ease of sliding over a carpeted surface.

Figure 3:
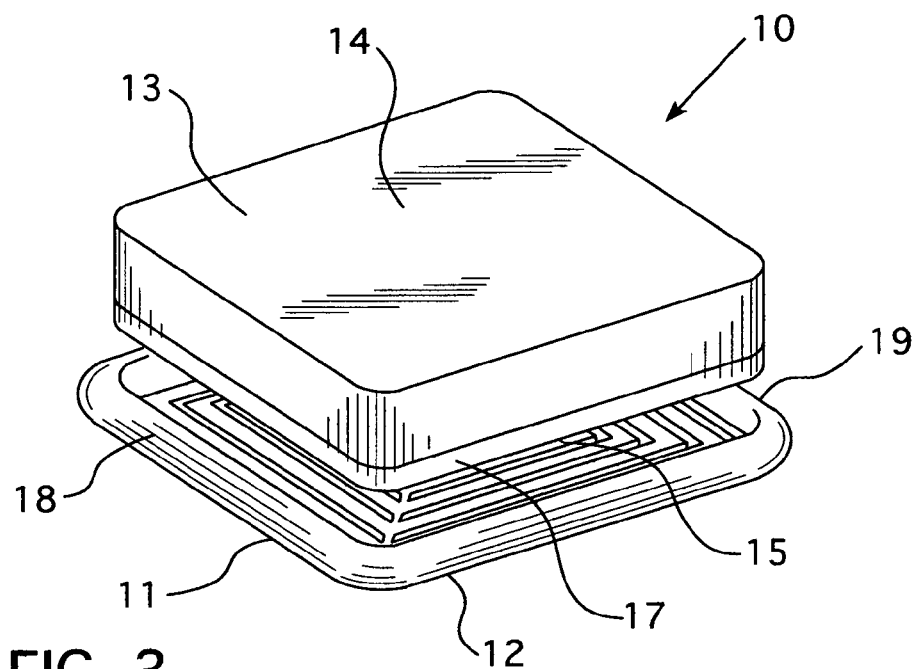
FIG. 3 is a perspective view of another embodiment of the furniture slide of the present invention as shown in an exploded configuration.

Referring next to FIG. 3, the furniture slide 10 illustrated therein is in all respects identical to that illustrated in FIGS. 1 and 2 with the exception that in this embodiment the configuration of the combination is square. This furniture slide is better suited for smaller table and chair legs and may in fact be left in place permanently under the furniture to also provide coaster support for the furniture.

Figure 4:
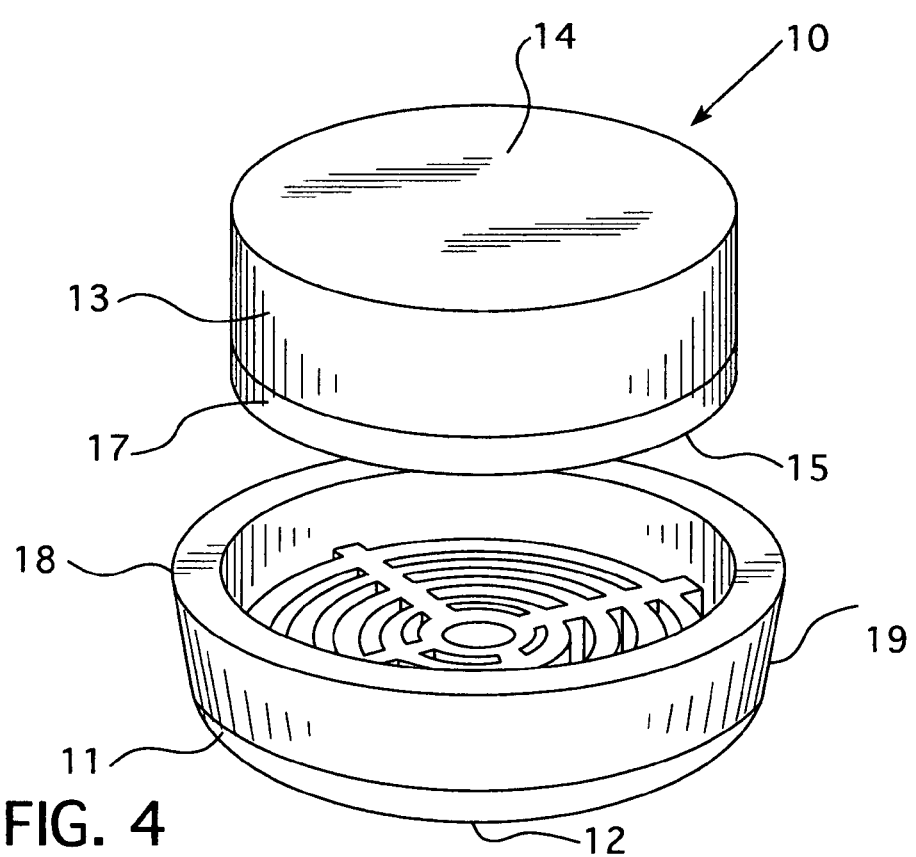
FIG. 4 illustrates yet another embodiment of the furniture slide of the present invention shown in exploded perspective form.

With reference to FIG. 4, another embodiment of the furniture slide 10 of the present invention is illustrated which is identical in all respects to the previous embodiments, with the exception that it is provided with a circular or round configuration. This furniture slide may also be left permanently underneath furniture legs to provide ease of movement when desired and simultaneously provide leg coasters to protect the floor surface.

Figure 5:
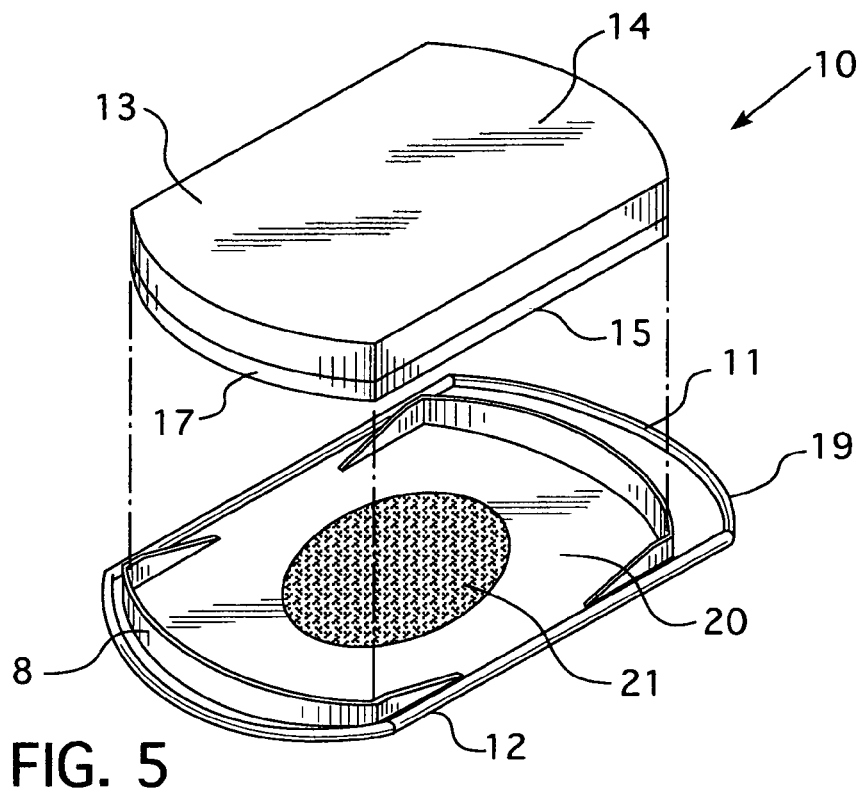
FIG. 5 is an enlarged exploded perspective view of the furniture slide shown in FIG. 1 with the addition of securement fabric provided on the top face of the slide member for assured securement of the block of compressible material thereto.

Referring next to the embodiment illustrated in FIG. 5, the furniture slide 10 is in all respects identical to that illustrated in FIG. 1, with the exception that the top face 16 of slide member 11 is provided with adhesive means 20 secured to the top face 16 for temporarily securing the felt fabric material 17 thereto. The adhesive means 20 is here provided in the form of hook securement fabric 21 which will temporarily hook and secure to the bottom face 15 of felt material 17. This assures that the compressible block 13 will remain engaged with slide member 11, yet permits separation thereof for use of the block 13 with its felt bottom 17 for use on hard floor surfaces.

Figure 6:
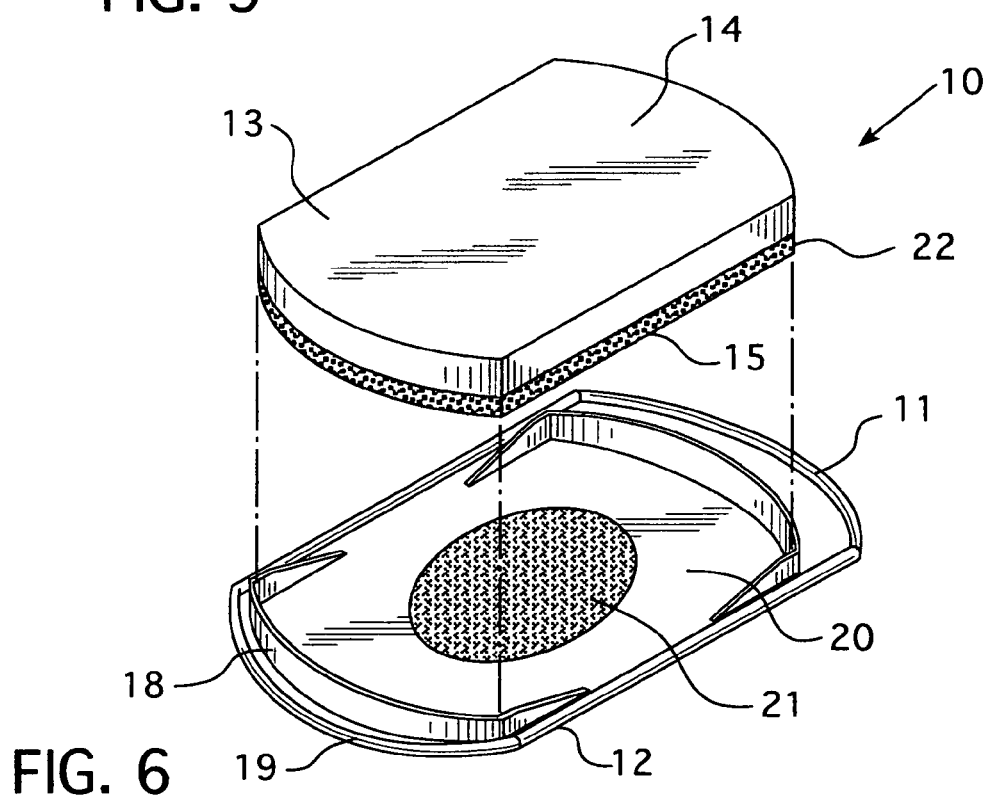
FIG. 6 is an exploded perspective view of the furniture slide shown in FIG. 5 with the exception that the bottom felt surface of the block of compressible material is substituted with loop securement fabric.

Turning next to the embodiment illustrated in FIG. 6, the furniture slide 10 therein illustrated is substantially identical to that illustrated in FIG. 5 with the exception that the felt material 17 on the bottom of compressible block 13 in FIG. 5 is instead replaced with loop securement fabric 22, which not only acts to better secure to the hook securement fabric 21, but in addition, serves as a suitable fabric material for sliding engagement on hard surfaces.

I claim:

1. A slide for placement between an object to be moved and flooring over which it is to be moved, the slide comprising:
    a slide member having top and bottom faces, the bottom face having a smooth surface for sliding on a carpeted floor;
    a block of compressible material having a top surface for supportive contact with an object to be moved, said block configured and dimensioned for a bottom surface thereof to be removably supported on said top face of said slide member; and
    said bottom surface of said block comprised of a fabric material for sliding engagement on a hard floor surface.

2. The slide of claim 1, said top face of said slide member having an upwardly protruding lip contoured and dimensioned for receiving and confining said block therein for removable support on said top face.

3. The slide of claim 1, including adhesive means on said top face of said slide member for temporarily securing said fabric material thereto.

4. The slide of claim 3, wherein said fabric material is felt and said adhesive means is hook securement fabric secured to said top face of said slide member.

5. The slide of claim 3, wherein said fabric material is loop securement fabric and said adhesive means is hook securement fabric secured to said top face of said slide member.

6. The slide of claim 1, wherein said fabric material is felt.

7. The slide of claim 1, wherein said bottom face of said slide member has upturned perimeter edges.

8. The slide of claim 7, wherein said bottom face of said slide member is convex.

* * * * *